United States Patent [19]

Nix et al.

[11] Patent Number: 4,624,585
[45] Date of Patent: Nov. 25, 1986

[54] RETAINER BUSHING

[75] Inventors: Richard A. Nix, Utica; Thomas J. Kudzia, Troy, both of Mich.

[73] Assignee: Automotive Products plc, Warwickshire, England

[21] Appl. No.: 764,241

[22] Filed: Aug. 9, 1985

Related U.S. Application Data

[63] Continuation of Ser. No. 578,709, Feb. 9, 1984, abandoned.

[51] Int. Cl.⁴ ...................... F16B 33/04; F16B 33/22; F16B 35/02
[52] U.S. Cl. .................... 384/296; 384/295; 384/297; 384/439; 411/377; 411/509
[58] Field of Search ............... 384/296, 295, 299, 300, 384/439, 297, 440, 436; 308/236; 411/352, 353, 377, 508, 509, 510; 24/621, 650

[56] References Cited

U.S. PATENT DOCUMENTS

| | | | |
|---|---|---|---|
| 3,299,737 | 1/1967 | Hurlin | 384/436 X |
| 3,415,155 | 12/1968 | Riddell et al. | 384/297 X |
| 3,481,655 | 12/1969 | Campbel | 308/236 X |
| 3,564,697 | 2/1971 | Shalaly et al. | 29/280 X |
| 3,565,499 | 2/1971 | Fisher | 384/439 |

*Primary Examiner*—Stuart S. Levy
*Assistant Examiner*—Lynn M. Sohacki
*Attorney, Agent, or Firm*—Hauke and Patalidis

[57] ABSTRACT

A retainer bushing for connecting a male member such as a shaft, rod or pin, for example the coupling pin of a motor vehicle clutch pedal, to a mechanical component having a bore accepting the shaft, rod or pin in the bore, for example the input member of a hydraulic master cylinder hydraulically connected to a slave cylinder actuating a clutch release mechanism. The retainer bushing has a flange at one end and one or more longitudinally projecting tangs at the other end. Each tang, which is elastically deflectable outwardly and inwardly, has a radially inwardly directed abutment surface for engagement with the other end of the bore when the flange is engaged at one end thereof, and an inwardly radially directed prong for engagement in a groove formed in the pin. The bushing is introduced into the bore, with the tangs elastically deflected inwardly, until the tangs snap back to their original position with their abutment surface preventing removal of the bushing from the bore, and the tangs are elastically deflected outwardly when the pin is introduced through the bushing bore until each tang snaps back to its original position with its inwardly directed prong engaged in the groove in the pin.

A tool permitting disassembly of the shaft, rod or pin from within the retainer bushing is also disclosed.

2 Claims, 10 Drawing Figures

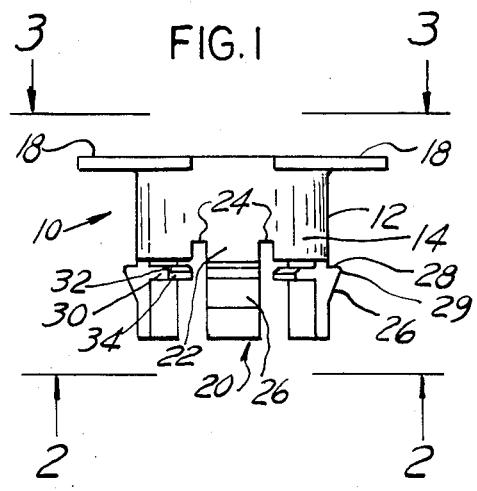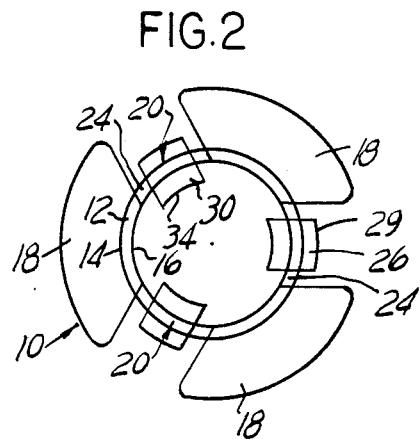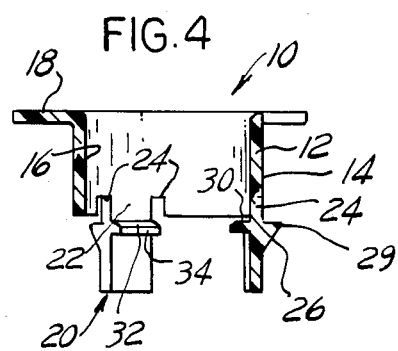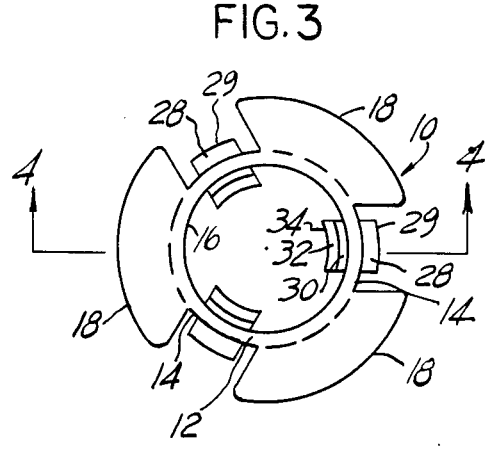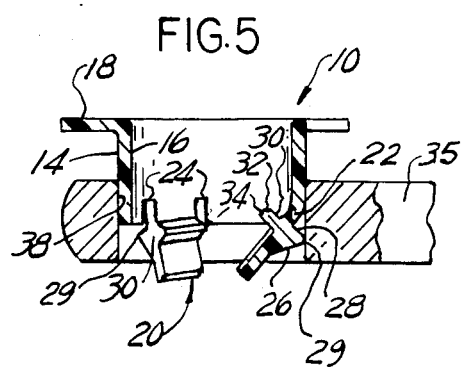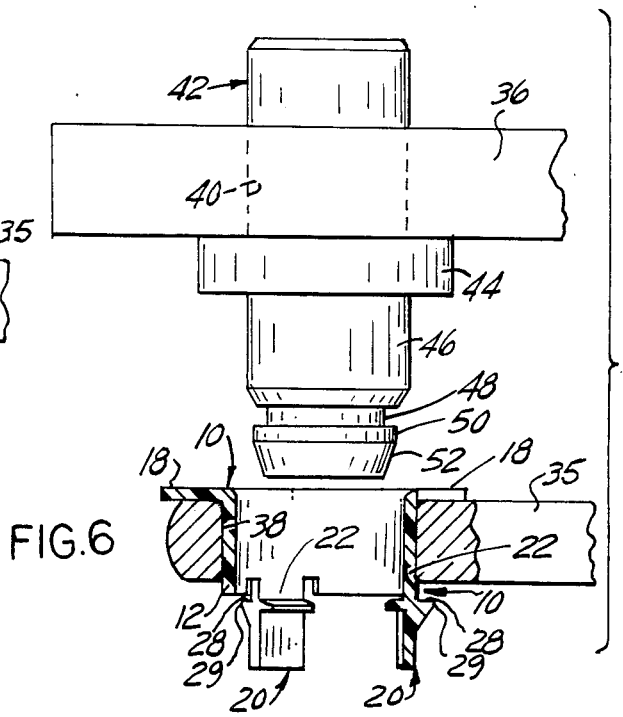

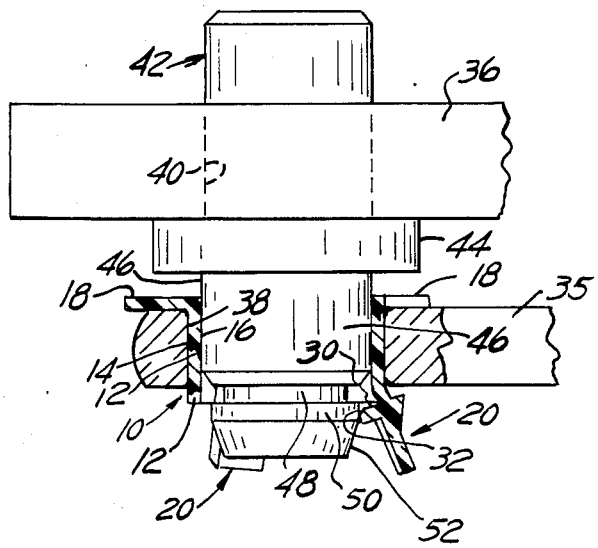
FIG.7
FIG.8
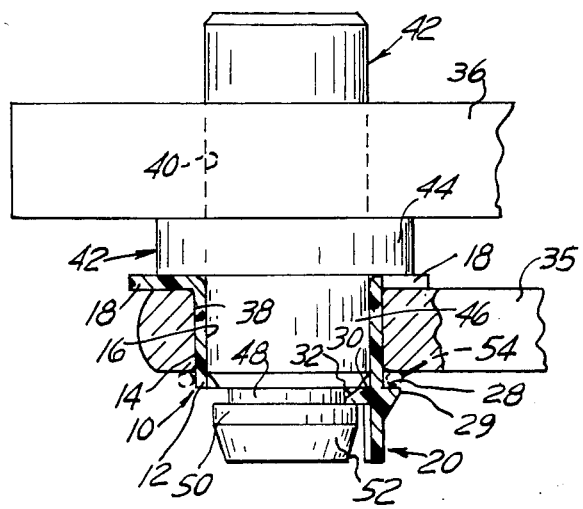
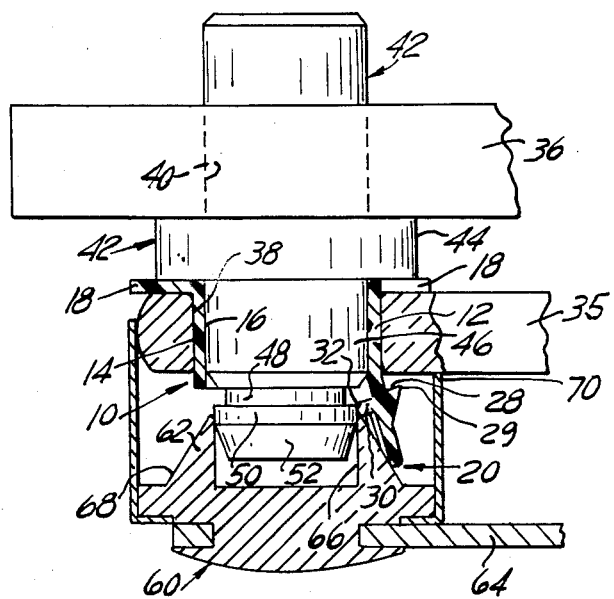
FIG.10
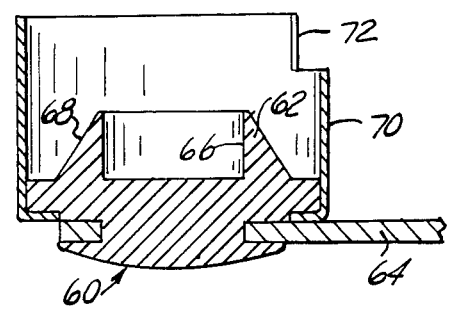
FIG.9

RETAINER BUSHING

This is a continuation of application Ser. No. 578,709 filed on Feb. 9, 1984, now abandoned.

BACKGROUND OF THE INVENTION

The present invention relates to retainers in general and more particularly to a retainer bushing disposed between a male member such as a shaft, rod or pin passed through a bore in a plate, for example, and holding the shaft, rod or pin and the plate in pivotal assembly.

There are many mechanical assemblies wherein a pin, rod or stubshaft is, pivotably or fixedly, attached to a plate, to an arm member, or to a pushrod end by being passed through a bore through the plate, arm member, or pushrod end, and being retained therein by a cotter pin installed in a transverse bore drilled through the end of the pin, rod or stubshaft, or by means of a spring clip engaged in a groove or other retainer member. An example of such mechanical assemblies is the pivotable coupling between a motor vehicle clutch pedal and the input member or pushrod of a hydraulic master cylinder forming part of a clutch hydraulic control apparatus.

The present invention presents the advantage over the prior art that it permits to assemble a male member such as a shaft, rod or pin to a plate, an arm member, or a pushrod end, for example, by simply pushing the end of the shaft, rod or pin into the bore of a retainer bushing according to the invention pre-installed in the bore of a plate, arm member or pushrod end, without requiring the use of special tools or any additional fasteners.

SUMMARY OF THE INVENTION

The principal object of the present invention is to provide a self-restraining snap-on retainer bushing pre-installed in the bore of a plate or arm member, the bushing being provided with a bore adapted to receive therethrough a male member such as a pin, rod, or shaft, the bushing being further provided with outwardly directed abutting and retaining elements which are elastically displaced during introduction of the bushing into the bore and automatically spring back to their original position to hold the bushing in the bore, and with inwardly directed abutting and retaining elements which are elastically displaced during introduction of the end of the pin, rod or shaft through the bushing and which automatically spring back to their original position into a groove formed at the end of the pin, rod or shaft such as to prevent removal of the pin, rod or shaft from within the bushing.

The invention has particular applications and advantages for effecting a rapid and secure coupling between the eye end of a linear actuator such as the pushrod of a hydraulic master cylinder or slave cylinder, respectively with an actuating or actuated component. As an example of application, the present invention provides a snap-on pivotable fit between the eye end of the master cylinder pushrod and a control member such as a clutch control pedal.

The many objects and advantages of the present invention will become apparent to those skilled in the art when the following description of the best mode contemplated for practicing the invention is read in conjunction with the accompanying drawing wherein like reference numerals refer to like or equivalent parts and in which:

BRIEF DESCRIPTION OF THE DRAWING

FIG. 1 is a side elevation view of a retainer bushing according to the present invention;

FIG. 2 is an end view thereof from line 2—2 of FIG. 1;

FIG. 3 is an end view thereof from line 3—3 of FIG. 1;

FIG. 4 is a section along line 4—4 of FIG. 3;

FIG. 5 is a view similar to FIG. 4 but showing the retainer bushing of the present invention in the process of being introduced into a bore in a mechanical part, such as the bore in the eye end of a linear actuator or pushrod;

FIG. 6 is an exploded view illustrating, in section, the retainer bushing in position and, in elevation, a pin adapted for introduction through the bushing for coupling of the pin with the mechanical part provided with the bore;

FIG. 7 is a view similar to FIG. 6 but showing the pin partially introduced into the bushing;

FIG. 8 is a view similar to FIG. 7 but showing the full assembly;

FIG. 9 is a sectional view of a tool adapted to facilitate disassembly of the pin from within the bushing; and FIG. 10 is a view showing the disassembly tool of FIG. 9 in operation.

DETAILED DESCRIPTION OF THE PREFERRED EMBODIMENT

Referring to the drawing, and more particularly to FIGS. 1-4 thereof, an example of structure for a retainer bushing 10, according to the present invention, comprises a cylindrical tubular body portion 12 having a cylindrical peripheral surface 14 of predetermined outer diameter and an interior cylindrical surface forming a bore 16 of predetermined inner diameter. A flange 18 is integrally formed at one end of the cylindrical tubular body portion 12. The flange 18, in the example of structure illustrated, and as best shown at FIGS. 2 and 3, comprises three separate outwardly radially extending sections disposed in a single plane substantially perpendicular to the axis of the tubular body portion 12. The other end of the bushing cylindrical tubular body portion 12 is provided with, in the example of structure illustrated, three longitudinally extending fingers or tangs 20 flexibly deflectable relative to the body portion 12. Each flexibly deflectable tang 20 has a foot portion 22 integral with the wall of the cylindrical tubular body portion 12, a pair of notches 24 extending longitudinally part of the way from the edge of the tubular body portion 12, such as to enable each tang 20 to elastically deflect from its foot portion 22. The exterior surface of each tang 20 has an outwardly projecting inclined ramp surface 26 ending in an outwardly extending abutment surface 28, the junction between the ramp surface 26 and the abutment surface 28 forming a tip 29. Each tang 20 is also provided with an inwardly extending retainer abutment prong 30 preferably ending with a ramp surface 32 proximate its tip 34. The abutment surface 28 and the top surface of the retainer prong 30 are radially extending, outwardly and inwardly, respectively, substantially in a single first plane and in a single second plane, the first and the second planes being substantially co-planar and perpendicular to the axis of the bushing cylindrical tubular body portion 12, in the example of structure illustrated.

Although the retainer bushing 10 may be made of any convenient resilient material such as spring steel, preferably it is molded in a single piece from an appropriate plastic material such as for example acetal resin or nylon such as the resin marketed by Du Pont de Nemours & Co. under the trademark DELRIN.

The retainer bushing 10 is particularly useful for providing a snap-together assembly or coupling between a mechanical element having a bore accepting therein the retainer bushing 10 for connection to another mechanical element provided with a projecting male member such as a pin, rod or shaft, the end of which is adapted to be passed through the internal bore 16 of the retainer bushing 10. An example of such an assembly is the connection between a motor vehicle clutch release pedal and the pushrod of a hydraulic master cylinder capable of remotely operating the motor vehicle clutch release mechanism by way of a hydraulic slave cylinder hydraulically interconnected to the master cylinder, as, for example, disclosed in detail in U.S. Pat. No. 4,407,125, assigned to the same assignee as the present application.

The master cylinder, not shown, is provided with a pushrod 35, FIGS. 5–8, which is coupled to a clutch control foot operated pedal arm 36, FIGS. 6–8. For that purpose, the end of the master cylinder pushrod 35 is enlarged and provided with an eye in the form of a bore 38 in which a retainer bushing 10, according to the present invention, is pre-installed, simply by pressing into the bore 38, as shown at FIG. 5. During pressing of the retainer bushing 10 into the bore 38, each tang 20 is progressively deflected elastically inwardly, as a result of the outer ramp surface 26 of each tang 20 engaging the inlet edge of the bore 38 and deflecting each tang 20, as illustrated at FIG. 5, from its foot portion 22 between the bottom of the notches 24, such that the peripheral tip 29 of the abutment surface 28 rides along the surface of the inner bore 38 of the eye end of the pushrod 35. As soon as the outer tip 29 of each abutment surface 28 is pushed beyond the end of the bore 38, the tangs 20 spring back to their original position, with the result that the retainer bushing 10 is held in the bore 38 with the peripheral surface 14 of its cylindrical body portion 12 engaged with the inner surface of the bore 38. The flange 18 and the abutment surfaces 28, disposed each at an end of the cylindrical tubular body portion 12, prevent the retainer bushing 10 from being disengaged from within the bore 38, FIG. 6.

The clutch pedal arm 36 has a bore 40 in which is fitted an end of a pin 42 retained by any convenient means such as by press fitting, welding, setscrews or the like. The other end of the pin 42, projecting from the clutch pedal arm 36, has an enlarged shoulder portion 44 defining a spacer between the pedal arm 36 and the master cylinder pushrod 35. The main body portion 46 of the pin 42 has a diameter fitting the inner diameter of the bore 16 in the tubular portion 12 of the retainer bushing 10, and a peripheral groove 48 proximate its end 50. The end 50 of the pin main body portion 46 is preferably of slightly reduced diameter as compared to the diameter of the pin main body portion 46, and terminates in a frusto-conical or tapered edge portion 52.

For assembling the master cylinder pushrod 35 to the clutch pedal pin 42, on the motor vehicle assembly line, all that is required is to manually press the pushrod 35, provided at its eye end with the retainer bushing 10 disposed in the bore 38, over the main body portion 46 of the pin 42, as illustrated at FIG. 7. The inclined ramp portion 32 of the inwardly projecting retainer prong 30 of each tang 20 rides on the tapered end surface 52 of the pin 42 such as to deflect the tang 20 outwardly, FIG. 7, until the tip 34 of each inwardly projecting retainer prong 30 falls into the groove 48 of the pin 42 and allows each tang 20 to spring back to its original position. Thus, with each retainer prong 30 engaged in the pin groove 48, the main body portion 46 of the pin 42 is prevented from being pulled back from the bore 16 of the retainer bushing 10, the retainer bushing 10 being in turn prevented from escaping from the pushrod eye end bore 38 by the interferring abutment surfaces 28 of each tang 20, FIG. 8.

While the main body portion 46 of the pin 42 is pushed through the bore 16 of the retainer bushing cylindrical tubular body portion 12, the flange 18 prevents the retainer bushing from being pushed through. Once the assembly is completed, if it is desired to eliminate the lateral play due to the distance separating the lower face of the flange 18 from the exteriorly extending tang abutment surfaces 28, an elastomeric O-ring or garter spring, as shown at 54 at FIG. 8, may be installed between the abutment surfaces 28 and the lateral surface of the pushrod 35 at its eye end.

Although the retainer bushing 10 of the present invention has been described and illustrated as provided with an end flange 18 in three segments and three tangs 20, it will be readily apparent to those skilled in the art that the flange 18 may be made in the form of a full radially outwardly projecting annular portion, or may be made in two, three, four or more sections and that the tongs 20 may be two in number, or four or more.

If it is desired to disconnect the clutch pedal arm 36 from the master cylinder pushrod 35, without damaging the retainer bushing 10, a tool, as shown at 60, at FIG. 9 may be used. The tool 60 comprises a tubular member 62 mounted on the end of a handle 64, the tubular member 62 having an inner bore 66 of a diameter accepting the reduced diameter end portion 50 of the pin 42 and a frusto-conical peripheral surface 68 forming a ramp deflecting outwardly each tang 20, when the annular portion 62 of the tool 60 is manually pushed over the end of the pin 42, as shown at FIG. 10, such as to pull the radial retainer prong 30 of each tang 20 from the pin groove 48. The tool 60 has a pilot cup 70 disposed concentrically surrounding the tubular member 62, the cup 70 having a cut-out portion, as shown at 72, for clearing the body of the pushrod 35. The cup 72 acts as a centering pilot means relative to the partially circular peripheral surface of the enlarged eye end of the pushrod 35.

Having thus described the present invention by way of an example of structure thereof well designed to accomplish the objects of the invention, modifications whereof will be apparent to those skilled in the art, what is claimed as new is as follows:

1. Assembly for pivotally coupling a first element having a cylindrical bore to a second element having a cylindrical male member, said assembly comprising a retainer bushing for holding the cylindrical male member of said second element within the cylindrical bore of said first element, said retainer bushing comprising a solid tubular body having a periphery fitting the cylindrical bore of said first element and a cylindrical internal bore accepting the cylindrical male member of said second element, said cylindrical internal bore of said tubular body having a longitudinal axis, a radially extending outwardly directed circular flange integrally formed at an end of said solid tubular body for engaging a surface of said first element at an end of the cylindrical bore of said first element, said circular flange being divided by cut-out portions in at least two substantially identical spaced apart portions disposed in a single plane perpendicular to the longitudinal axis of the cylindrical internal bore of said solid tubular body, at least two flexible tangs substantially aligned each with one of said flange cut-out portions, each of said flexible tangs being elastically deflectable outwardly and inwardly and extending longitudinally at the other end of said solid tubular body and formed integrally at said other end, a pair of notches extending longitudinally part of the way from said other end of said solid tubular body and defining a foot portion for each of said flexible tangs extending partially into said solid tubular body such that each of said flexible tangs is elastically deflectable relatively to said solid tubular body at said foot portion, the circumferential distance between the tangs being substantially greater than the circumferential width of the notches, each of said flexible tangs having a radially extending outwardly directed abutment surface for engaging a surface of said first element at the other end of the cylindrical bore of said first element and an inwardly radially extending prong, a peripheral groove in said cylindrical male member, each of said flexible tangs having an outward ramp surface causing deflection of each of said flexible tangs upon introduction of said bushing in the cylindrical bore of said first element, whereby said solid tubular body of said bushing is installed in the cylindrical bore of said first element with said flexible tangs elastically deflected inwardly, said flexible tangs being allowed to spring back to their original position whereby said solid tubular body is held in the cylindrical bore of said first element by the radially extending abutment surface of each of said flexible tangs, said flexible tangs being adapted to be outwardly elastically deflectable for introduction of said cylindrical male member into the internal cylindrical bore of said solid tubular body for engagement of the prong of each of said flexible tangs within said peripheral groove in said cylindrical male member, wherein said cylindrical male member has a tapered portion beyond said peripheral groove forming a ramp for progressively deflecting outwardly said flexible tangs by engagement with the prong of each of said flexible tangs during introduction of said cylindrical male member within the cylindrical internal bore of said solid tubular body, and each of said flexible tangs has an end portion projecting beyond said prong for allowing withdrawal of said cylindrical male member from the cylindrical internal bore of said solid tubular body, by outwardly deflecting each of said tangs by outwardly exerting a force on each projecting end portion thereof for disengaging each of said prongs from the peripheral groove of said cylindrical male member.

2. In combination with an assembly according to claim 1, a tool for removing said cylindrical male member from within the cylindrical internal bore of the solid tubular body of said retainer bushing, said tool comprising an annular portion having a bore accepting said tapered portion of said cylindrical male member beyond said peripheral groove, and a frusto-conical peripheral surface on said annular portion defining a ramp for engaging the projecting end portion of each of said tangs and progressively elastically deflecting said flexible tangs outwardly for disengaging each of said prongs from said peripheral groove in said cylindrical male member.

* * * * *